US011011766B2

(12) United States Patent
Yu et al.

(10) Patent No.: US 11,011,766 B2
(45) Date of Patent: May 18, 2021

(54) FUEL CELL SYSTEM HAVING OXYGEN SENSOR, AND CONTROL METHOD THEREOF

(71) Applicants: Hyundai Motor Company, Seoul (KR); Kia Motors Corporation, Seoul (KR)

(72) Inventors: Jung Han Yu, Gyeonggi-do (KR); Jong Kil Oh, Gyeonggi-do (KR); Gun Hyung Park, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 52 days.

(21) Appl. No.: 16/208,964

(22) Filed: Dec. 4, 2018

(65) Prior Publication Data

US 2020/0091530 A1 Mar. 19, 2020

(30) Foreign Application Priority Data

Sep. 18, 2018 (KR) ........................ 10-2018-0111182

(51) Int. Cl.
*H01M 8/04791* (2016.01)
*H01M 8/1004* (2016.01)
(Continued)

(52) U.S. Cl.
CPC ..... *H01M 8/04798* (2013.01); *H01M 4/8807* (2013.01); *H01M 8/04223* (2013.01);
(Continued)

(58) Field of Classification Search
CPC ......... H01M 8/04798; H01M 8/04455; H01M 8/1004; H01M 2250/20
See application file for complete search history.

(56) References Cited

U.S. PATENT DOCUMENTS

2003/0003333 A1* 1/2003 Haridoss ............. H01M 8/2457 429/431
2006/0008689 A1* 1/2006 Yonekura ............ H01M 8/0432 429/415

(Continued)

FOREIGN PATENT DOCUMENTS

JP 2003168442 A 6/2003
JP 2006054165 A 2/2006

(Continued)

OTHER PUBLICATIONS

Hong, Bo Ki, et al. "On the impact of water activity on reversal tolerant fuel cell anode performance and durability." Journal of Power Sources 328 (2016): 280-288.

(Continued)

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

A fuel cell system and a control method thereof are provided. In the system, an oxygen sensor is mounted on the anode inlet side and the anode outlet side of a fuel cell stack to measure an oxygen concentration. Based on the measured oxygen concentration, a control operation is performed on the fuel cell system to reduce the oxygen concentration on the anode side. Accordingly, the irreversible deterioration of the fuel cell occurring due to the reverse voltage of the cell during driving of the fuel cell vehicle and the cathode carbon corrosion occurring due to the inflow of air during parking are effectively reduced, thereby increasing the durability of the fuel cell and the fuel cell vehicle.

14 Claims, 9 Drawing Sheets

(51) Int. Cl.
*H01M 8/0444* (2016.01)
*H01M 4/88* (2006.01)
*H01M 8/04223* (2016.01)

(52) U.S. Cl.
CPC ..... *H01M 8/04455* (2013.01); *H01M 8/1004* (2013.01); *H01M 2250/20* (2013.01)

(56) References Cited

U.S. PATENT DOCUMENTS

| | | | | |
|---|---|---|---|---|
| 2012/0141896 | A1* | 6/2012 | Im .................... | H01M 8/04303 429/429 |
| 2016/0372766 | A1* | 12/2016 | Ohs .................. | H01M 8/04223 |
| 2017/0200959 | A1* | 7/2017 | Ihonen ............. | H01M 8/04228 |

FOREIGN PATENT DOCUMENTS

| | | | |
|---|---|---|---|
| JP | 2014049434 | A | 3/2014 |
| KR | 20120061282 | A | 6/2012 |

OTHER PUBLICATIONS

Bona, Denis, et al. "Using a Stack Shunt to Mitigate Catalyst Support Carbon Corrosion in PEM Fuel Cell Stacks during Start-Stop Cycling." (2013).

Knights, Shanna D., et al. "Aging mechanisms and lifetime of PEFC and DMFC." Journal of Power Sources 127.1-2 (2004): 127-134.

Ralph, T. R., and M. P. Hogarth. "Catalysis for low temperature fuel cells." Platinum Metals Review 46.3 (2002): 117-135.

* cited by examiner

FUEL CELL SYSTEM HAVING OXYGEN SENSOR, AND CONTROL METHOD THEREOF

CROSS REFERENCE TO RELATED APPLICATION

The present application claims priority to Korean Patent Application No. 10-2018-0111182, filed on Sep. 18, 2018, the entire contents of which is incorporated herein for all purposes by this reference.

BACKGROUND

Field of the Invention

The present invention relates to a fuel cell system and a control method thereof and, more particularly, to a fuel cell system that enables normal driving of a vehicle even in an irreversible deterioration mode of the fuel cell due to the reverse voltage, and also responds to the irreversible deterioration due to the inflow of external air (oxygen) into a cathode during vehicle parking and the movement of the air to an anode, thereby improving the durability of the fuel cell and the vehicle, and a control method thereof.

Description of the Related Art

Generally, fuel cells are a type of power generation device that converts chemical energy of a fuel into electric energy by electrochemically reacting a fuel gas and an oxidizer gas, and are widely used as power supplies not only for industrial, domestic and automotive use, but also for small electric/electronic appliances or portable devices. A polymer electrolyte membrane fuel cell (PEMFC) having a high power density is often used today as a fuel cell for vehicles. In particular, the PEMFC operates as a power source (e.g., electric power source) that supplies electric power to a motor and various electric devices driving a vehicle within a fuel cell vehicle. The PEMFC uses hydrogen as a fuel gas, and oxygen or air containing oxygen as an oxidizer gas. Additionally, the PEMFC must be able to operate reliably over a wide current density range to achieve high output performance of at least several tens of kilowatts at various operating conditions of the vehicle.

Further, a fuel cell includes unit cells that each generate electric energy by reacting a fuel gas and an oxidizer gas, and the unit cells are typically stacked and connected in series to meet an output demand level. Since a high output is required, unit cells which individually generate electric energy are stacked to satisfy the requirements. The unit cell of the PEMFC includes, from the innermost side thereof, a membrane electrode assembly (MEA), a gas diffusion layer (GDL) which supplies the fuel gas and the oxidant gas, which are reaction gases, to the membrane electrode assembly and transfers the generated electric energy, a gasket and a fastening mechanism used to maintain the tightness and sufficient tightening pressure of the reaction gases and the cooling water, and a separator or bipolar plate that transfers the reaction gases and the cooling water.

Among the components forming the unit cell of such a fuel cell, the membrane electrode assembly (MEA) includes a polymer electrolyte membrane capable of transporting hydrogen ions, and an anode and a cathode that are electrodes, which are attached to both surfaces of the polymer electrolyte membrane and are coated with a catalyst that allows hydrogen as a fuel gas and air (oxygen) as an oxidant gas to react with each other. On the outer portion, i.e. the outer portion of the anode and cathode, the gas diffusion layer (GDL) is laminated for uniformly distributing the fuel gas and the oxidant gas, and on the outer portion of the gas diffusion layer, the separator plate is attached thereto for supplying the reaction gas to the gas diffusion layer while providing a flow field through which the reaction gas and the cooling water, and water produced by the reaction flow.

In addition, a gasket or the like for sealing the fluid may be interposed between the components of the unit cell, and the gasket may be integrally molded to the membrane electrode assembly or the separator plate. An end plate for supporting the cells is connected to the outermost side of the unit cells, and a stack fastening mechanism is used to couple the cells and the end plate, thereby constructing a fuel cell stack. Particularly, electrons migrate to the cathode via an external circuit to generate electric current.

Further, in the cathode, oxygen molecules, hydrogen ions and electrons react with each other to produce water as a reaction byproduct, along with heat. Water produced in the electrochemical reaction in the fuel cell aids in maintaining the humidifying property of the membrane electrode assembly when an appropriate amount is present. However, when the water is excessively produced, flooding may occur, which is a water overflow phenomenon at high current density unless properly removed. In the event of a flooding phenomenon, the excessive amount of water interferes with the efficient supply of the reaction gases into the fuel cell, thereby further increasing the voltage loss. Additionally, the cell performance of the fuel cell may be deteriorated.

Meanwhile, when the voltage of some cells in the fuel cell stack decreases while a fuel cell electric vehicle (FCEV) is being operated, conventionally, the current limitation is started and at the same time, one or more of the anode purge, an increase in a supply of hydrogen, an increase in hydrogen pressure, an increase in a supply of air, and an increase in air pressure are performed to induce normal driving of the vehicle. When the voltage decrease of some cells further increases, the output current of the fuel cell stack is limited to a lower level. Accordingly, conventionally, system-level control for the induction of normal driving is performed through a predetermined control logic, wherein an R value obtained from the average cell voltage and the minimum cell voltage is used to determine the degree of decrease in the cell voltage. The R indicates the degree of decrease in the cell voltage, which is used as a basis for determining the current limitation in the fuel cell vehicle, and may be calculated by the following equation:

$$R=V\min/V\text{avg}$$

wherein, Vmin represents the minimum cell voltage, Vavg represents the average cell voltage, and the smaller the R value, the greater the deviation between the minimum cell voltage Vmin and the average cell voltage Vavg.

In the conventional control logic, when the R value is equal to or greater than the set value R3 ($R3 \leq R \leq 1$), the fuel cell operates in the normal current range allowed by the system and the vehicle is driven normally. However, when the R value is less than the set value R3 ($R2<R<R3$, $R2<R3$), the current limiting mode is activated and thus, the available maximum current is decreased, and at the same time, one or more of the anode purge, an increase in a supply of hydrogen, an increase in hydrogen pressure, an increase in a supply of air, and an increase in air pressure are performed.

Thereafter, when the cell drift further increases, that is, when the R value decreases ($R1<R \leq R2$, $R1<R2$), the available maximum current for recovery of the cell voltage is further decreased, wherein the available maximum current decreases at a constant slope as the R value decreases. Further, when the R value decreases ($R \leq R1$), the cell voltage deviation is extreme, leading to the vehicle being stopped.

As described above, in the fuel cell vehicle, a current limiting mode in which the available maximum current is changed based on the R value indicating the degree of the cell voltage deviation is performed. Meanwhile, although the conventional control logic is applicable to the case where the cell performance may be reversibly recovered, it has a limit in an irreversible deterioration mode, such as a flooding phenomenon, in which the cell performance is degraded due to the accumulation or collection of water in the fuel cell stack, which causes interruption of the flow of reaction gases (hydrogen and air).

In addition, it is known that the reverse voltage generated in the cells in the fuel cell has a substantial adverse effect on the performance of the fuel cell, thereby substantially reducing the cell voltage. Generally, the shortage of hydrogen in a fuel cell is classified into an “overall hydrogen starvation” phenomenon in which the hydrogen supply is insufficient for the entire fuel cell, and a “local hydrogen starvation” phenomenon in which in spite of sufficient hydrogen supply for the whole cell, hydrogen supply becomes insufficient due to uneven distribution.

The hydrogen shortage phenomenon often occurs in operating conditions such as uneven supply and distribution of hydrogen gas, a sudden increase in the load demand for the fuel cell, start-up of the fuel cell, etc. In this way, when the anode of the fuel cell is short of hydrogen, the anode voltage (Vanode) increases. As the anode voltage continuously increases, the anode voltage further increases with respect to the cathode voltage (Vcathode), resulting in a reverse voltage state in which the cell voltage (Vcell) becomes smaller than zero (Vell=Vcathode−Vanode<0).

Further, in a reverse voltage state due to an increase in anode voltage, a water electrolysis reaction such as the following reaction formula 1 occurs first.

$$H_2O \rightarrow \frac{1}{2}O_2 + 2H^+ + 2e^-, E^o = 1.229 \text{ V (vs. SHE)} \quad \text{Reaction Formula 1}$$

wherein, $E^o$ represents a standard electrode potential, and SHE represents a standard hydrogen electrode.

However, as the anode voltage continues to increase, the carbon corrosion reaction at the anode accelerates as in the following reaction formulas 2 and 3:

$$C + 2H_2O \rightarrow CO_2 + 4H^+ + 4e^-, E^o = 0.207 \text{ V (vs. SHE)} \quad \text{Reaction Formula 2}$$

$$C + H_2O \rightarrow CO + 2H^+ + 2e^-, E^o = 0.518 \text{ V (vs. SHE)} \quad \text{Reaction Formula 3}$$

When the reverse voltage state in the cell continues and an excessive reverse voltage state in which the cell voltage is less than about −2 V is reached, the heat generation of the fuel cell becomes excessive and thus, the membrane electrode assembly (MEA), the gas diffusion layer (GDL), and the like are generally damaged, and particularly, serious problems that pin-holes are generated in the membrane electrode assembly and, consequently, the cells are electrically shorted may occur.

This leads to a cell failure state in which the fuel cell is unable to be operated normally. The overall hydrogen shortage leading to a cell failure can be detected by monitoring the hydrogen supply state using a sensor in a fuel cell operating apparatus (Balance Of Plant: BOP). However, the local hydrogen shortage in some cells can be detected only by closely monitoring the voltage of each cell of the fuel cell stack with a stack voltage monitoring (SVM) device thus providing a complex control system. Therefore, it is important to develop a fuel cell system and an operation control technology that can operate the fuel cell vehicle properly before reaching the reverse voltage state to thus operate the vehicle more stably, and provide excellent durability against reverse voltage.

Even when fuel cell operation control is performed according to the R value as in the conventional control logic described above when the performance of some cells drastically decreases due to the reverse voltage, irreversible deterioration of cell performance occurs in the fuel cell, and in severe cases, the fuel cell vehicle may be shut down and the safety of the driver and the passenger may be threatened. Another irreversible deterioration is the carbon corrosion deterioration of the cathode catalyst layer due to the inflow of external air (oxygen) into the cathode and the movement of the external air to the anode during the parking. For example, when a valve is installed in an air supply line connected to the cathode inlet side of the fuel cell stack or in an exhaust line connected to the cathode outlet side in a fuel cell system of a vehicle, external air may enter the cathode through a gap in the valve during the parking of the vehicle.

Further, a part of the air introduced into the cathode may move to the anode through the cathode and the electrolyte membrane. In particular, since the air and the hydrogen fuel exist together in the anode of the fuel cell, an air/hydrogen fuel boundary is formed between the air and the hydrogen fuel, and an air region and a hydrogen fuel region are provided in the anode. As a result, compared to the air region inside the cathode that is disposed opposite to the hydrogen fuel region in the anode with the electrolyte membrane interposed therebetween, in the air region inside the cathode that is disposed opposite to the air region in the anode with electrolyte membrane interposed therebetween, high voltage above 1V is generated, and serious carbon erosion occurs at that position. This is irreversible deterioration, which leads to poor performance and shortened life span, and once occurred, it cannot be recovered.

SUMMARY

Accordingly, the present invention provides a fuel cell system that enables normal driving of a vehicle even in the irreversible deterioration mode of the fuel cell due to the reverse voltage, and also responds to the irreversible deterioration due to the inflow of external air (oxygen) into a cathode during vehicle parking and the movement (crossover) of the air to an anode, thereby improving the durability of the fuel cell and the vehicle, and a control method thereof.

In order to achieve the above object, according to one aspect of the present invention, a fuel cell system may include: a fuel cell stack; a hydrogen supply device configured to supply hydrogen to the fuel cell stack; an air supply device configured to supply air to the fuel cell stack; a controller configured to operate a fuel cell operation device; and an oxygen sensor installed within the fuel cell stack to detect an oxygen concentration in gases on the anode side.

During operation of the fuel cell system, the controller may be configured to determine whether a current oxygen concentration on the anode side satisfies a predetermined condition that is predicted to generate a reverse voltage, based on a real time oxygen concentration value detected by the oxygen sensor and a first oxygen concentration reference value corresponding to the current fuel cell operating current. When the current oxygen concentration on the anode side is determined to satisfy the predetermined condition, the controller may be configured to operate the fuel cell operation device to reduce the oxygen concentration on the anode side to thus prevent deterioration on the anode side due to generation of the reverse voltage in the cells of the stack.

According to another aspect of the present invention, a method of controlling a fuel cell system may include: detecting an oxygen concentration in gases on an anode side by an oxygen sensor installed within a fuel cell stack during operation of the fuel cell system; determining, by the controller, whether a current oxygen concentration on the anode side satisfies a predetermined condition that is predicted to generate a reverse voltage, based on a real time oxygen concentration value detected by the oxygen sensor and a first oxygen concentration reference value corresponding to the current fuel cell operating current. When the current oxygen concentration on the anode side is determined to satisfy the predetermined condition, the method may include operating a fuel cell operation device to reduce the oxygen concentration on the anode side to thus prevent deterioration on the anode side due to generation of the reverse voltage in the cells of the stack.

According to the fuel cell system and the control method thereof of the present invention, the oxygen sensor may be mounted on the anode inlet side and the anode outlet side of the fuel cell stack to measure the oxygen concentration, and based on the measured oxygen concentration, a control operation may be performed on the fuel cell system to reduce the oxygen concentration on the anode side, thereby effectively reducing the irreversible deterioration of the fuel cell that may occur due to the reverse voltage of the cell during driving of the fuel cell vehicle and the cathode carbon corrosion due to the inflow of air during parking.

Particularly, in the present invention, the concentration of oxygen generated in the electrolysis step of water prior to the carbon corrosion stage at the time of reverse voltage may be measured, and if the oxygen concentration is above a particular level, control for proactive response may be performed before occurrence of carbon corrosion, which is irreversible deterioration, thereby preventing the carbon corrosion from occurring. In addition, as compared with the periodic purge operation to prevent carbon corrosion without the oxygen sensor during vehicle parking, in the present invention, only when the oxygen concentration on the anode side of the stack measured by the oxygen sensor increases to be equal to or greater than the reference value, may the hydrogen supply and the anode purge operation be performed, thereby being advantageous in terms of efficiency and power consumption.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
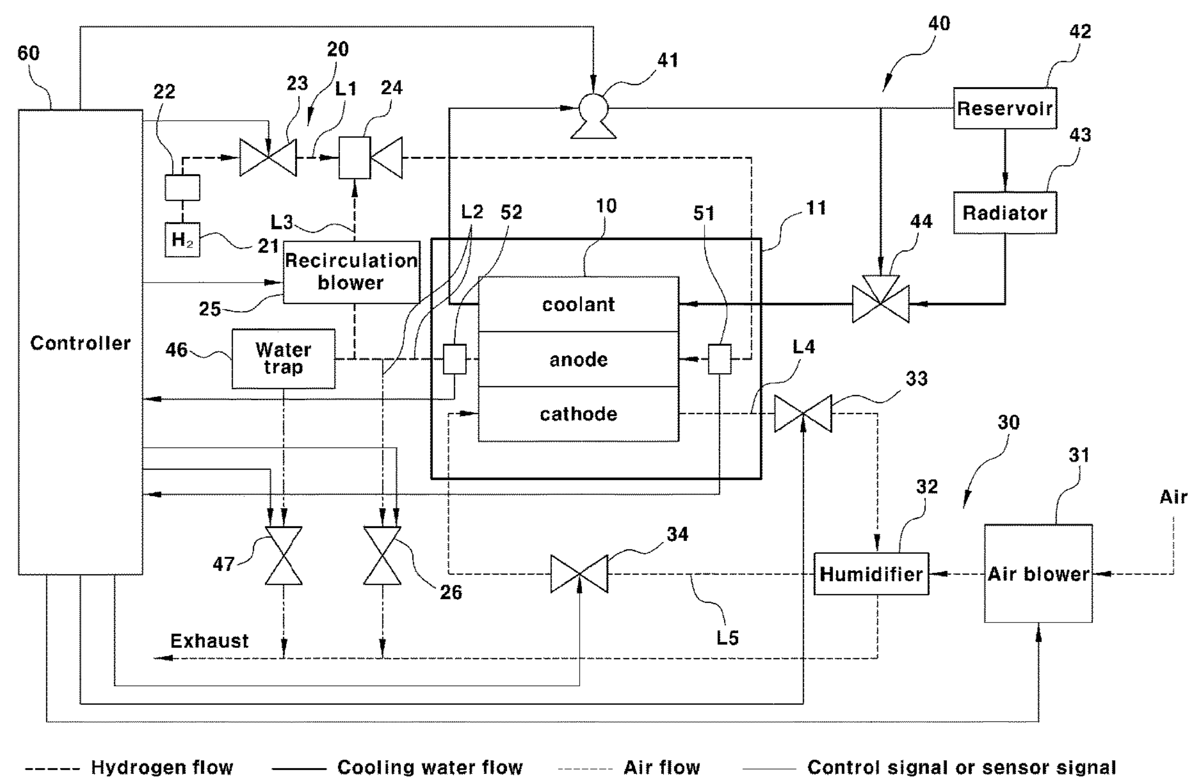
FIG. 1 is a block diagram illustrating a fuel cell system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings to allow those skilled in the art to easily implement the embodiments. However, the present invention is not limited to those exemplary embodiments, but may be implemented into other forms.

The present invention provides a fuel cell system enabling normal driving of a vehicle even in the irreversible deterioration mode of a fuel cell due to the reverse voltage, and also responds to the irreversible deterioration due to the inflow of external air (oxygen) into a cathode during vehicle parking and the movement (crossover) of the air to an anode, thereby improving the durability of the fuel cell and the vehicle.

In other words, the present invention effectively prevents the deterioration of an anode electrode due to the reverse voltage generated during the driving of a fuel cell vehicle and the deterioration of a cathode electrode caused by the formation of an interface between air/hydrogen fuel at the anode during parking of the fuel cell vehicle. Accordingly, in the present invention, an oxygen sensor may be mounted on the inlet and outlet sides of the anode of the fuel cell to rapidly detect oxygen, which is a byproduct of the water electrolysis reaction before the carbon corrosion reaction upon the reverse voltage due to the hydrogen shortage in the anode, and thus, the carbon corrosion reaction may be prevented from proceeding by performing the control for avoiding the hydrogen shortage problem.

Further, in the present invention, the oxygen concentration in the gases that may be present in the anode during parking may be detected rapidly by the oxygen sensor, and the hydrogen in the anode may be purged before the formation of the interface between the air/hydrogen fuel is intensified, thereby performing the control operation of discharging residual oxygen from the cell.

The oxygen sensor may be installed proximate to each cell of the fuel cell stack, and system control based on the signal from the oxygen sensor may be performed. In particular, the present invention is mainly characterized in that system control may be performed to avoid hydrogen shortage in the anode and remaining oxygen during parking based on the signals from the oxygen sensor installed on the inlet and outlet sides of the anode in the fuel cell stack, thereby preventing deterioration of the cell from occurring.

FIG. 1 is a block diagram of a fuel cell system in which an oxygen sensor may be mounted on the inlet and outlet sides of an anode in a fuel cell stack according to an exemplary embodiment of the present invention. As shown in the figure, the fuel cell system mounted on a vehicle may include: a fuel cell stack 10 configured to generate electrical energy from an electrochemical reaction of a reactive gas (i.e., hydrogen as a fuel gas and oxygen in the air as an oxidant gas); a hydrogen supply device 20 configured to supply hydrogen as a fuel gas to the fuel cell stack 10; an air supply device 30 configured to supply air containing oxygen as an oxidant gas to the fuel cell stack 10; a heat and water management system 40 configured to adjust the operation temperature of the fuel cell stack 10 and perform a water management function of the fuel cell stack; and a controller 60 configured to execute the entire operation of a fuel cell operating device including the hydrogen supply device 20 and the air supply device 30, and the fuel cell system.

Particularly, the hydrogen supply device 20 may include a hydrogen tank 21, a pressure regulator 22, a hydrogen supply valve 23, a hydrogen recirculator, and the like. The air supply device 30 may include an air blower 31, humidifier 32, and the like. The heat and water management system 40 may include an electric water pump (e.g., cooling water pump) 41, a reservoir 42, a radiator 43, a 3-way valve 44, a water trap 46, and the like. In the hydrogen supply device 20, high-pressure hydrogen supplied from the hydrogen tank 21 serving as a hydrogen storage portion may be adjusted to an appropriate pressure using the pressure regulator 22 and the hydrogen supply valve 23, and then may be supplied to the fuel cell stack 10.

At this time, the hydrogen recirculator may be configured to recirculate the unreacted hydrogen, discharged from the anode of the fuel cell stack 10, to the anode using an ejector 24 or a recirculation blower 25, and then the anode may be supplied with fresh hydrogen from the hydrogen tank 21, together with the recirculated gas recirculated by a recirculating unit, in a mixed state. The hydrogen recirculation device may be used for the purpose of reusing the unreacted hydrogen remaining in the fuel cell stack 10, and may include a recirculation line L3 connected between an anode inlet side exhaust line L2 connected to the anode outlet side of the fuel cell stack 10 and a hydrogen supply line L1 connected to the anode inlet side, with the ejector 24 and/or the recirculation blower 25 installed together in the recirculation line L3.

The air supply device 30 may be configured to humidify the air supplied by the air blower 31 using the humidifier 32 and then supply the air to the cathode of the fuel cell stack 10. The humidifier 32 may be configured to perform the humidification by moisture exchange between the humid air discharged from the cathode of the fuel cell stack 10 and the dry air supplied to the cathode. The heat and water management system 40 may include a device configured to adjust the stack temperature, which may include the electric water pump 41 configured to circulate cooling water, the reservoir 42 configured to store the cooling water, the radiator 43 configured to dissipate heat of the cooling water, and 3-way valve 44 configured to adjust a flow of cooling water to cause the cooling water selectively to flow to the radiator 43.

In addition, the water trap 46 for water management may be disposed on the anode outlet side of the fuel cell stack 10 to store water discharged from the anode of the fuel cell stack, and a drain valve 47 may be installed on the outlet side of the water trap 46. The drain valve 47 may be configured to open to discharge the water stored in the water trap 46. Further, a purge valve 26 may be disposed in the anode-side exhaust line L2 of the fuel cell stack 10.

During the operation of the fuel cell stack 10, nitrogen in the air supplied to the cathode and a water product (water and water vapor) produced in the cathode crossover through the electrolyte membrane inside the stack to move to the anode side. In particular, foreign substances such as nitrogen, water and water vapor, which are impurities, may be removed through the purge operation of periodically opening the purge valve 26 disposed in the anode outlet-side line L2. Shutoff valves 33 and 34 for improving the durability of the fuel cell stack 10 may be disposed at the air supply line L5 connected to the cathode inlet side of the fuel cell stack 10 and at the exhaust line L4 connected to the cathode outlet side, respectively. The shutoff valves 33 and 34 shut off the fuel cell system and a flow path of the air supply line L5 and the cathode outlet side exhaust line L4 during parking of the vehicle to block an inflow of air into the cathode in the stack.

In the fuel cell system, the controller 60 may be configured to operate each valve as well as the air blower 31, the recirculation blower 25, the electric water pump 41, etc., and may be configured to receive the signals from the oxygen sensors 51 and 52. The oxygen sensors 51 and 52 may be installed inside a stack enclosure 11 that seals the fuel cell stack 10, and may be provided on both the inlet and outlet sides of the anode in the fuel cell stack 10. There is no particular limitation on the type of the oxygen sensor 51 or 52 in the present invention, but the types of the applicable oxygen sensor may include a semiconductor oxygen sensor, a combustion oxygen sensor, etc.

Materials that adsorb and desorb oxygen in semiconductor oxygen sensors may include titanium dioxide ($TiO_2$), strontium titanium oxide ($SrTiO_3$), gallium (III) oxide ($Ga_2O_3$), cerium oxide ($CeO_2$), or the like. An oxygen sensor using one or more of these materials may be used. In the present invention, the oxygen sensors 51 and 52 may be disposed on the inlet and outlet sides of the anode, and based on the signals from the oxygen sensors 51 and 52, control operations may be performed for preventing the reverse voltage deterioration during driving of the fuel cell vehicle (e.g., control for preventing deterioration of the anode) and for preventing the cathode carbon corrosion (e.g., control for preventing deterioration of the cathode) occurring when air flows into the stack during parking of the fuel cell vehicle.

Figure 2:
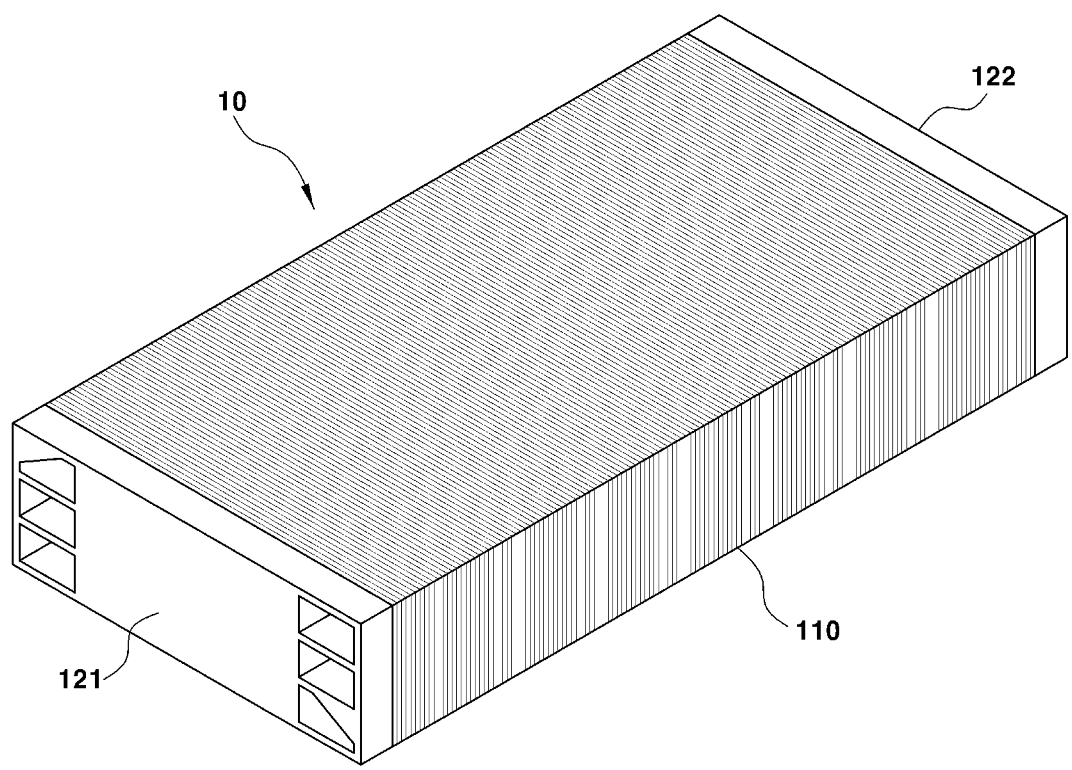
FIGS. 2 to 4 are views illustrating the state in which oxygen sensors are installed on a fuel cell stack in the fuel cell system according to the exemplary embodiment.
Figure 3:
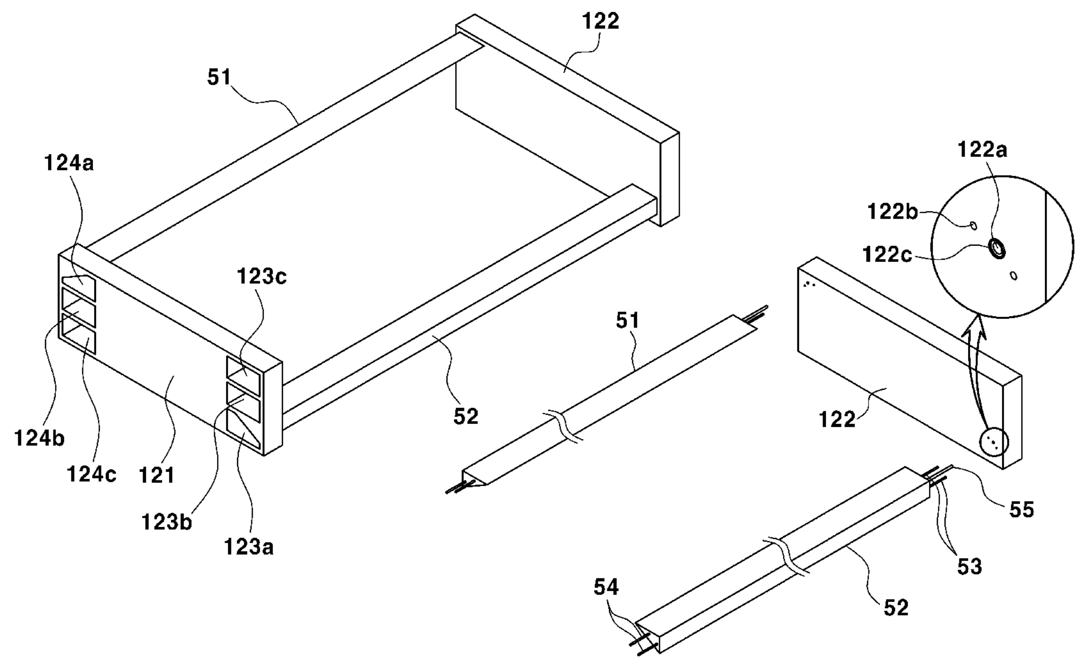
Figure 4:
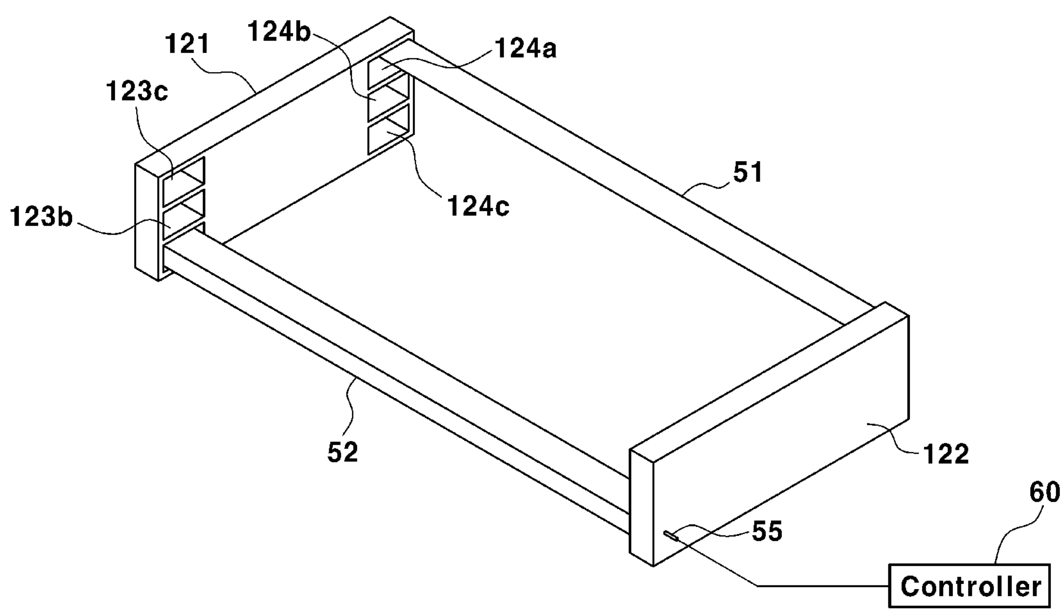

FIGS. 2 to 4 are views illustrating the state in which oxygen sensors are installed on a fuel cell stack in the fuel cell system according to the exemplary embodiment. In the present invention, the oxygen sensor 51, 52 may be installed on the anode outlet side of the fuel cell stack 10, and more particularly, as shown schematically in FIG. 1, in addition to the anode outlet side, may also be installed on the anode inlet side. In other words, in the exemplary embodiment of the present invention, the oxygen sensors 51 and 52 may be installed on both the inlet and outlet sides of the anode in the fuel cell stack 10, and the oxygen sensors 51 and 52 and the controller 60 may be electrically connected to each other so that the electrical signals from the oxygen sensors 51 and 52, that is, the oxygen detection signals from the oxygen sensors 51 and 52, may be input to the controller 60.

In the exemplary embodiment of the present invention, the oxygen sensors 51 and 52 may be provided in the fuel cell stack 10 to be inserted into an anode outlet manifold (111 in FIGS. 6A and 6B) which is the anode outlet passage portion, and into an anode inlet manifold which is the anode inlet passage portion. Particularly, the anode outlet manifold 111 and the anode inlet manifold (not shown) refer to a single continuous gas path formed by stacking the separator plates of the cells in the fuel cell stack 10 to connect manifold apertures formed in the separator plates to each other along the stacking direction of the cells.

The anode inlet manifold is an anode inlet side passage in the stack that distributes hydrogen gas to each cell, and the anode outlet manifold 111 is an anode outlet side passage in the stack where the anode side exhaust gas passed through the cell collects. More specifically, the anode inlet manifold is an inlet passage through which hydrogen passes before being supplied and distributed to anode channels of the respective cells in the fuel cell stack 10, and the anode outlet manifold 111 is an outlet passage through which the gas after passing through the anode channel of each cell in the fuel cell stack 10 is allowed to pass. In the exemplary embodiment of the present invention as described before, as shown in FIGS. 2 to 4, the oxygen sensors 51 and 52 may be inserted and installed along an inner passage of the anode inlet manifold, which is an anode inlet side passage, and along an inner passage of the anode outlet manifold (111 in FIGS. 6A and 6B), which is an outlet side passage.

FIG. 2 is a perspective view showing the fuel cell stack 10 in which an oxygen sensor is installed in a fuel cell system according to an exemplary embodiment of the present invention. In each cell (unit cell) of the fuel cell stack 10, a membrane electrode assembly (MEA) in which an anode electrode and a cathode electrode are bonded to both surfaces of an electrolyte membrane, gas diffusion layers (GDLs) bonded to outer surfaces of the anode electrode and the cathode electrode on both sides of the membrane electrode assembly, respectively, anode and cathode separator plates stacked on outer surfaces of the both gas diffusion layers, respectively, and gaskets interposed between the parts of the cell to seal the parts may be provided.

In the conventional fuel cell stack 10, end plates 121 and 122 for supporting the cells may be coupled to the outermost ends of a stacked body 110 in which the cells having the above-described structure may be stacked, and in the exemplary embodiment of the present invention, the oxygen sensors 51 and 52 may be installed to be inserted into the anode outlet passage and the anode inlet passage in the stack 10 such that both ends thereof are coupled to and supported by the end plates 121 and 122. In other words, in the exemplary embodiment of the present invention, the oxygen sensors 51 and 52 may be arranged to be inserted into and installed along the anode inlet passage (i.e., the anode inlet manifold) and the anode outlet passage (i.e., anode outlet manifold) in the fuel cell stack 10, wherein both ends of the oxygen sensors may be coupled to and supported by the end plates 121 and 122.

As a result, the oxygen sensors 51 and 52 may be inserted longitudinally into the anode inlet passage and the anode outlet passage in the cell stacking direction. In particular, the oxygen sensors 51 and 52 sequentially pass through the cells stacked between the end plates 121 and 122 at both ends thereof along the anode inlet passage and the anode outlet passage. Since the oxygen sensors 51 and 52 may be installed in the anode inlet passage and the anode outlet passage as described above, an empty space not occupied by the oxygen sensor in each passage space becomes a channel space through which the gas may pass.

In the exemplary embodiment of the present invention, the oxygen sensors 51 and 52 may have an elongated shape to thus be inserted into the anode inlet side passage and the anode outlet side passage. Coupling pins 53 and 54 may be provided at both ends of the oxygen sensors 51 and 52 for coupling with the end plates 121 and 122 and for supporting the sensor and guiding assembly of the sensor. A wire 55 for outputting a sensor signal (detection signal) may be disposed on one side of the respective oxygen sensors 51 and 52. In addition, after being inserted into the respective passages, the oxygen sensors 51 and 52 may be coupled to the end plates 121 and 122 by fastening the coupling pins 53 and 54 through pin grooves 122*b* formed in the end plates 121 and 122 at both ends of the oxygen sensors 51 and 52, and the wire 55 may be connected to the outside through a through-hole 122*a* of one of the end plates 121 and 122.

A first end plate 121 of the two end plates 121 and 122 in the fuel cell stack 10 may include an anode inlet manifold and an anode outlet manifold 111 of the cell stack body 110; a cathode inlet manifold and a cathode outlet manifold; a hydrogen inlet aperture 124*a* and a hydrogen outlet aperture 123*a* in communication with a cooling water inlet manifold and a cooling water outlet manifold, respectively; an air inlet aperture 123c and an air outlet aperture 124c; and a cooling water inlet aperture 123b and a cooling water outlet hole 124b, whereas a second end plate 122 is not provided with such inlet and outlet apertures.

At this time, the hydrogen inlet aperture 124a and the hydrogen outlet aperture 123a in the end plate 121 have a structure in which a portion of the square aperture region is blocked, unlike the air inlet aperture 123c and the air outlet aperture 124c, and the pin groove 122b may be formed in the blocked portion. In addition, the end plate 122 may include the pin groove 122b and the aperture 122a to allow the coupling pins 53 and 54 of the oxygen sensors 51 and 52 to be inserted into and engaged with the pin grooves 122b of the end plates 122 and 122, thereby allowing the oxygen sensors 51 and 52 to be disposed and supported in predetermined positions in the respective passages. The wires 55 of the oxygen sensors 51 and 52 may be inserted through the aperture 122a formed in the end plate 122 and exposed to the outside through the aperture 122a, and connected to the controller 60 via a conductive line.

In the exemplary embodiment, a sealing member may be disposed in the aperture 122a of the end plate 122, through which the wire 55 of the oxygen sensor 51, 52 passes, to provide the airtightness between the wire 55 and the aperture. By providing the airtightness by the sealing member 122c, the oxygen sensors 51 and 52 and the controller 60 may be electrically connected to each other without excluding factors affecting an electrical connection and the wire 55 of the oxygen sensors 51 and 52 in an humid environment inside the fuel cell stack.

FIGS. 3 and 4 are views showing the structure in which the oxygen sensors 51 and 52 may be coupled to the end plates 121 and 122 at both ends of the stack with the cell stack body 110 removed. The coupling pins 53 and 54 formed at both ends of the oxygen sensors 51 and 52 may be inserted into the pin grooves 122b of the both end plates 121 and 122, respectively. The wires 55 formed on one side of the oxygen sensors 51 and 52 may be electrically connected to the controller 60 through the aperture 122a of the end plate 122.

Figure 5:
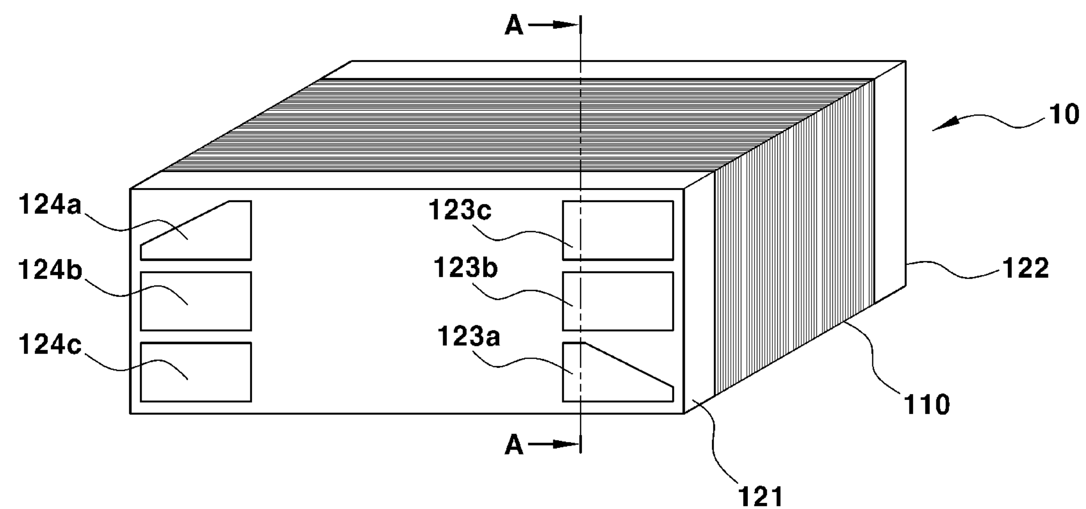
FIGS. 5, 6A, and 6B are views illustrating the state in which oxygen sensors are installed on a fuel cell stack in the fuel cell system according to the exemplary embodiment.
Figure 6A:
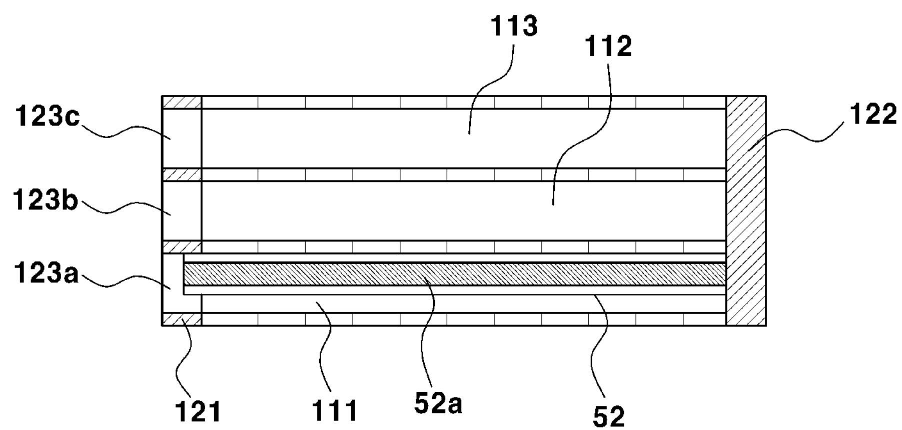
Figure 6B:
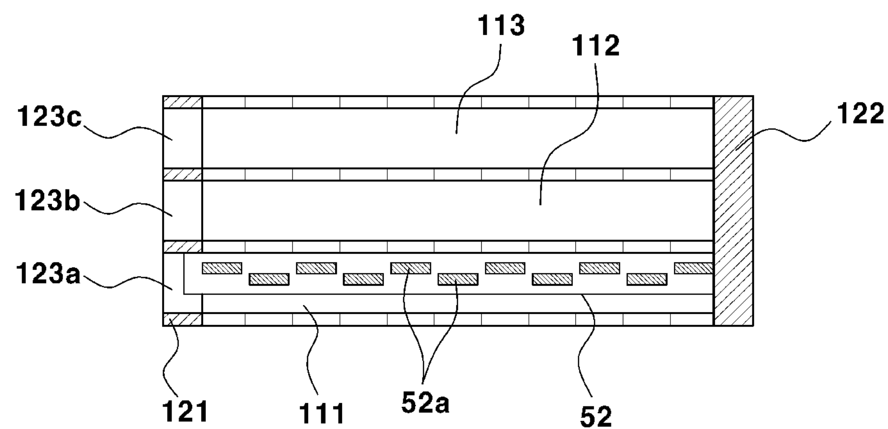

FIGS. 5, 6A, and 6B are views illustrating the state in which the oxygen sensors are installed on the fuel cell stack in the fuel cell system according to the exemplary embodiment, wherein FIGS. 6A and 6B are cross-sectional views taken along line A-A of FIG. 5. Reference numeral 111 denotes an anode outlet manifold which is an anode outlet passage, reference numeral 112 denotes a cooling water inlet manifold, and reference numeral 113 denotes a cathode inlet manifold.

As shown in FIG. 5, an oxygen sensor (i.e., a first oxygen sensor) 52 may be inserted into and installed on the hydrogen outlet of the cell stack body 110 in the fuel cell stack 10, that is, the anode outlet manifold 111, which is the anode outlet side passage, and an oxygen sensor (i.e., a second oxygen sensor) 51 may be inserted into and installed on the anode inlet manifold, which is an anode inlet passage. FIG. 6A shows an exemplary embodiment using the oxygen sensor 52 having an integral long sensing portion 52a. FIG. 6B shows an exemplary embodiment using the oxygen sensor 52 having a plurality of sensing portions 52a provided in the form of individual sensor elements.

In the present invention, the oxygen sensors 51 and 52 may be installed at positions abutting the anode side of each cell to allow for rapid oxygen measurement in real time. This configuration facilitates rapid responsiveness to the occurrence of the reverse voltage and carbon corrosion occurring during vehicle parking. As described above, the oxygen sensors 51 and 52 may be inserted into and installed on the anode inlet side passage (anode inlet manifold) and the anode outlet side passage (anode outlet manifold) 111 in the stack. As shown in FIG. 6A, it may be possible to insert the oxygen sensor 52 having the long sensing portion 52a into the passage 111.

As shown in FIG. 6B, the oxygen sensor 52 may be used in which a plurality of sensing portions 52a, each having a long rod-shaped sensor body and provided in the form of individual sensor elements, may be arranged along the longitudinal direction of the sensor body. In the exemplary embodiment of FIG. 6B, the sensing portions 52a provided in the form of individual sensor elements in the sensor body may be connected in parallel through internal conductors provided in the sensor body, and through the wires 55 of the oxygen sensor 52 and external leads, along with the internal conductors, the respective sensing portions 52a may be connected in parallel to the controller 60.

The sensing portions 52a may be arranged along the longitudinal direction in the sensor body to thus arrange one sensing portion 52a for each cell. To secure the gap and measurement interval between the sensing portions 52a, as shown in FIG. 6B, the sensing portions 52a may be arranged in a zigzag manner. In the exemplary embodiment of FIG. 6B, the anode side oxygen concentration may be measured for each cell by the sensing portions 52a connected in parallel in the oxygen sensors 51 and 52, and the oxygen concentration may be measured at the position corresponding to each cell.

Therefore, similar to monitoring of the cell voltage, the controller 60 may be configured to monitor the anode side oxygen concentration for each cell. As a result, according to the exemplary embodiment of FIG. 6B, it may be possible to more accurately determine that cells having an oxygen concentration of a certain level or more are generated among all cells, and to perform a control operation for preventing the reverse voltage and the carbon corrosion during parking. When the oxygen concentration of the cell has a highest value among all the cells, that is, when the maximum oxygen concentration is greater than a particular level, a control operation for preventing the reverse voltage during driving of the vehicle the carbon corrosion during parking of the vehicle may be performed. Additionally, according to the exemplary embodiment of FIG. 6B, management and treatment for the reverse voltage history may be efficiently performed for each cell in the aspect of after-sales service. In the meantime, in the present invention, the oxygen sensors 51 and 52 may be configured to output an electrical signal that correspond to the oxygen concentration in the anode-side gas. One of the known oxygen sensors 51 and 52 may be adopted as long as it is of the type capable of detecting oxygen in the gas and generating an electrical signal corresponding to the detected oxygen concentration.

Figure 7:
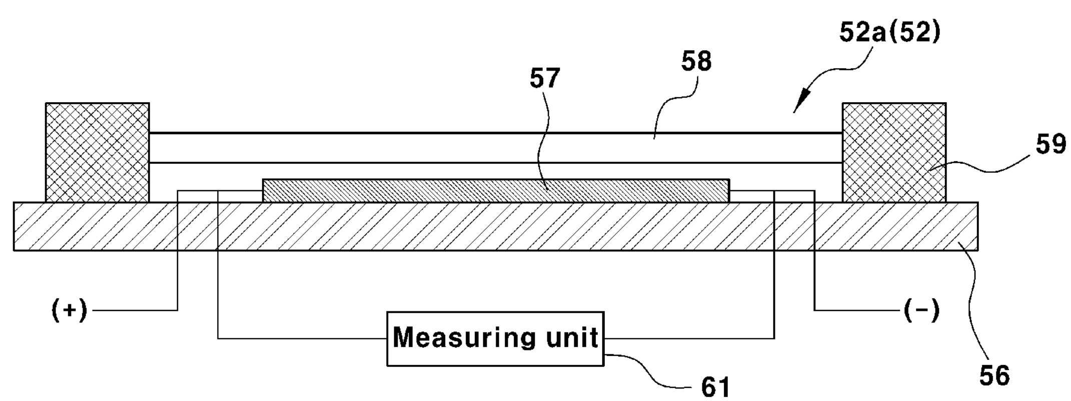
FIG. 7 is a cross-sectional view illustrating a sensing part of the oxygen sensor in the fuel cell system according to an exemplary embodiment of the present invention.

FIG. 7 is a cross-sectional view showing the configuration of an exemplary sensing portion 52a of each oxygen sensor 52 in the fuel cell system according to the exemplary embodiment of the present invention. As shown in the figure, the sensing portion 52a of the oxygen sensors 51 and 52 may include a substrate 56, a catalyst layer 57 formed on the surface of the substrate 56, an oxygen permeable membrane 58 disposed above the catalyst layer 57, and a partition structure 59 that seals or divides a sensing space, which is a space between the permeable membrane 58 and the substrate 56 and in which the catalyst layer 57 is located, into sub-spaces while sealing them.

Particularly, the substrate 56 may be installed longitudinally on a body of the oxygen sensors 51 and 52, and the catalyst layer 57 and the partition structure 59 may be laminated on the upper surface thereof. The partition structure 59 is a structure that may be stacked on the upper surface of the substrate 56 to fix and support the oxygen permeable membrane 58. Even in the case of the oxygen sensors 51 and 52 having the single elongated sensing portion 52*a* as in the exemplary embodiment of FIG. 6A, the sensor portion 52*a* may have one catalyst layer 57 integrated with the entire sensing portion 52*a*, or may have a catalyst layer 57 integrated over a plurality of fuel cell units for each portion of the entire sensing portion. In the case of the partition structure 59, the sensing part 52*a* may be formed to be divided into a predetermined shape (e.g., a rectangular shape) of a predetermined area.

In the case of the oxygen sensors 51 and 52 having the plurality of sensing portions 52*a* as in the exemplary embodiment of FIG. 6B, the sensing portion 52*a* of FIG. 7 may become one sensor element, and the plurality of sensing portions 52*a* may be arranged in the sensor body to be positioned one-by-one for each cell. The oxygen permeable membrane 58 in the sensing portion 52*a* of the oxygen sensors 51 and 52 may be a polytetrafluoroethylene (PIPE) membrane having pores in consideration of water repellency and temperature for a humid environment. In addition, for the semiconductor oxygen sensor, the catalyst layer 57 may be formed of one or more of titanium dioxide ($TiO_2$), strontium titanium oxide ($SrTiO_3$), gallium (III) oxide ($Ga_2O_3$), cerium oxide ($CeO_2$), or the like.

The above oxides may be used alone as the catalyst layer 57, which may alternatively be provided in a form in which one or more types of such oxides are added to a support such as silica dioxide ($SiO_2$), alumina oxide ($Al_2O_3$), or zirconia (zirconium dioxide, $ZrO_2$). In addition, the catalyst layer 57 may have a film or wire shape. In the sensing portion 52*a* of the oxygen sensors 51 and 52, a voltage signal generated when oxygen passes through the oxygen permeable membrane 58 and reacts in the catalyst layer 57 may be output as an electrical signal indicating an oxygen concentration.

In FIG. 7, a measuring unit 61 may be a measuring element in the controller 60 configured to receive the electrical signal that indicates the oxygen concentration and acquire the oxygen concentration information corresponding thereto. A method of calculating an oxygen concentration may include calculating a resistance (e.g., semiconductor type oxygen sensor) that changes during oxygen adsorption/desorption or a reactivity (e.g., combustion type oxygen sensor) of the catalyst layer 57 due to an inflow of oxygen. However, the present invention does not limit the sensing method thereto. Since the configuration, the sensing method, and the oxygen concentration-calculating method of the oxygen sensor 51, 52 having the configuration of the sensing portion 52*a* shown in FIG. 7, the semiconductor type oxygen sensor, or the combustion type oxygen sensor are known in the art, the detailed description thereof will be omitted herein.

Figure 8:
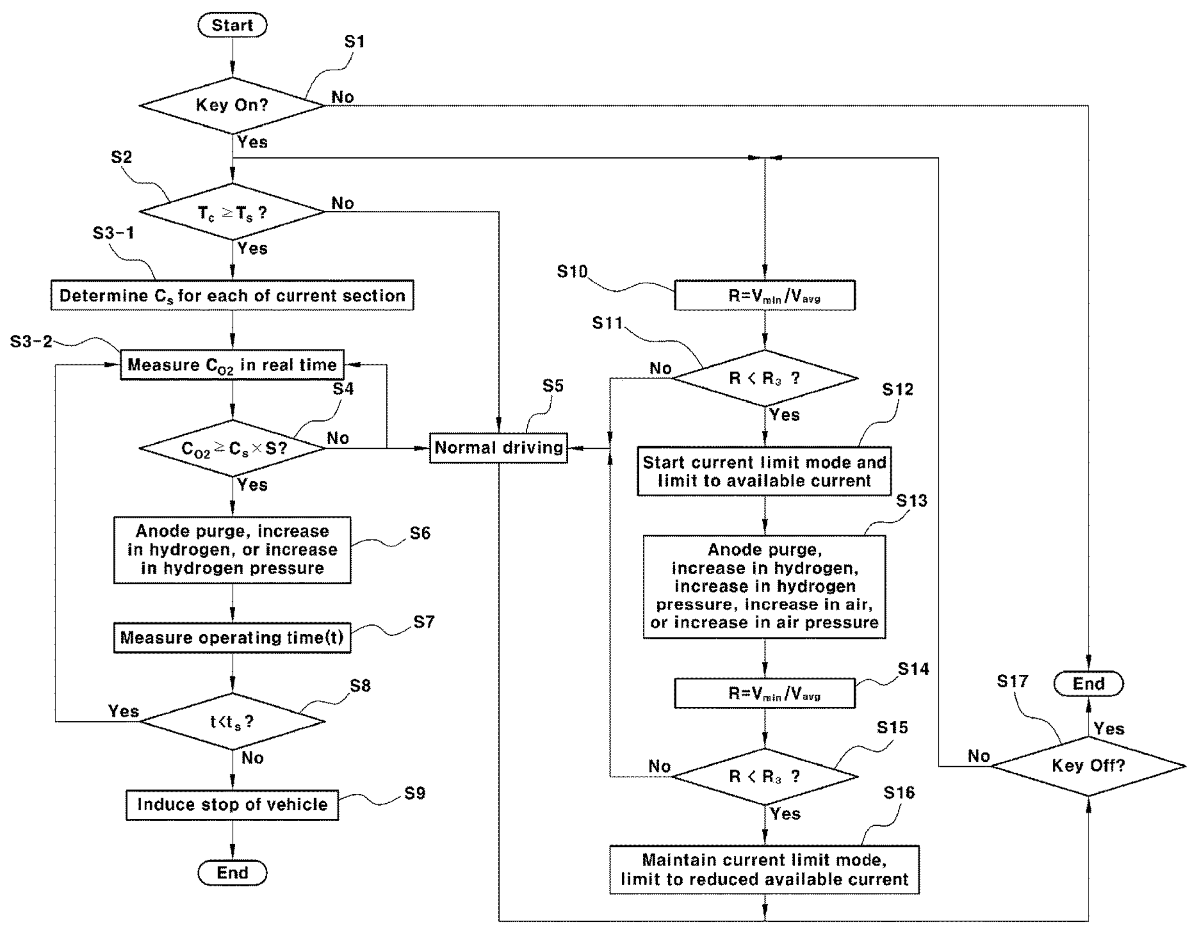
FIG. 8 is a flow chart illustrating a procedure of controlling the fuel cell system according to an exemplary embodiment of the present invention.

FIG. 8 is a flowchart showing the control process of the fuel cell system according to the present invention. In the control process, the oxygen concentration in the fuel cell stack 10 may be measured using the oxygen sensors 51 and 52 when the vehicle is being operated, and based on the measured oxygen concentration, irreversible deterioration due to the reverse voltage of the fuel cell may be prevented. In addition, the flow chart of FIG. 8 also shows a control process for recovering the performance of the fuel cell when the cell voltage decreases due to flooding or the like. As described above, the deterioration prevention control process according to the present invention may be performed concurrently with the control process for recovery of performance reduced when the cell voltage decreases.

First, when the driver starts the vehicle by turning on the ignition key (Key On) for driving the vehicle (S1), the operation of the fuel cell system may be started, and the controller 60 may be configured to operate the fuel cell system during the operation of the vehicle. When the operation of the fuel cell system is started by starting the vehicle as described above, to prevent the concentration measurement errors due to remaining oxygen on the anode inlet and outlet sides at the beginning of operation of the fuel cell system, the controller 60 may be configured to determine whether the cooling water temperature (which is the operation temperature of the stack) Tc of the fuel cell stack 10 detected by a sensor reaches the set temperature Ts and is stabilized (S2), and when the cooling water temperature Tc reaches the set temperature Ts or greater (Tc≥Ts), may be configured to perform the next process using the signal from the oxygen sensor.

In other words, when the cooling water temperature Tc increases and becomes equal to or greater than the set temperature Ts after the start of operation of the fuel cell system, the controller 60 may be configured to determine an oxygen concentration reference value using the signal of the oxygen sensors 51 and 52 (S3-1), and acquire a real time oxygen concentration value from the signals of the oxygen sensors 51 and 52 (S3-2). Although it is described that the controller 60 may be configured to determine that the cooling water temperature Tc has increased to reach the set temperature Ts after the operation of the fuel cell as shown in FIG. 8, instead of determining that the cooling water has reached the set temperature, the controller 60 may be configured to determine whether the set time has elapsed after the start of the operation of the fuel cell system by starting the vehicle, and only when the set time has elapsed after the start of operation of the fuel cell system, perform the next process using the signal of the sensor.

In an exemplary embodiment, the set temperature Ts may be set to about 50° C., and the set time may be set to about 2 minutes. When the cooling water temperature Tc, which is the operating temperature of the fuel cell stack 10, is equal to or greater than about 50° C., which is the set temperature Ts, or when about two minutes have elapsed since the start of the fuel cell stack 10, the controller 60 may proceed to the subsequent process.

The controller 60 may be configured to receive the signals of the oxygen sensors 51 and 52 provided in the anode inlet side passage and the anode outlet side passage of the fuel cell stack 10 after the start of the vehicle, and when the cooling water temperature Tc has increased and reached the set temperature Ts (or when the set time has elapsed since the start of the operation of the fuel cell system) as described above, the controller may be configured to perform the subsequent process to determine an oxygen concentration reference value Cs for each current range using the signals of the oxygen sensors 51 and 52 (S3-1). In addition, as described above, the controller 60 may be configured to perform an oxygen concentration measurement process of obtaining a real time oxygen concentration value ($C_{O2}$) from the signals of the oxygen sensors 51 and 52 (S3-2).

In the control process according to the present invention, the reference concentration value (Cs) (hereinafter referred to as an 'oxygen concentration reference value') of oxygen moved from the cathode to the anode after starting may be used to reduce the reverse voltage deterioration. The oxygen concentration reference value Cs may be based on the concentration of oxygen in each stack operation current range, which is moved from the cathode to the anode in the same fuel cell system. The oxygen concentration reference value Cs may be determined as an average oxygen concentration value for a predetermined time taken from the signals of the oxygen sensors 51 and 52 for each fuel cell stack operation current range when the cooling water temperature Tc becomes equal to or greater than the set temperature Ts after key-on of the vehicle.

Particularly, the operating current range refers to a current range of a predetermined range based on the stack operating current. For example, the operating current range may be divided into three sections, a low current section, a medium current section, and a high current section, each of which has a predetermined current range. In other words, the operation current range may include a low current section having about 0 A<I<100 A, a medium current section having about 100 A<I<200 A, and a high current section having about 200 A<I based on the stack operation current I.

When the fuel cell system starts to operate and the cooling water temperature Tc becomes equal to or greater than the set temperature Ts (or the set time has elapsed after the start of the operation of the fuel cell system) when the stack operation current range is set in the controller 60, the average value of oxygen concentration for a predetermined time may be calculated from the time when the operation current of the fuel cell stack enters the corresponding section, and then the calculated average value may be determined as the oxygen concentration reference value Cs of the corresponding current section. For example, when the cooling water temperature Tc is equal to or greater than the set temperature Ts, the average oxygen concentration value for a predetermined time after the operation current of the fuel cell stack enters the low current section, that is, an average value of the oxygen concentration measured by the oxygen sensors may be calculated, and the calculated average value may be determined as the oxygen concentration reference value Cs of the corresponding current section (e.g., the low current section).

Further, when the cooling water temperature Tc is equal to or greater than the set temperature Ts, the average oxygen concentration value for a predetermined time after the operation current of the fuel cell stack enters the medium current section may be calculated, and the calculated average value may be determined as the oxygen concentration reference value Cs of the corresponding current section (e.g., the medium current section). Further, when the cooling water temperature Tc is equal to or greater than the set temperature Ts, the average oxygen concentration value for a predetermined time after the operation current of the fuel cell stack enters the high current section may be calculated, and the calculated average value may be determined as the oxygen concentration reference value Cs of the corresponding current section (e.g., the high current section).

The determination of the oxygen concentration reference value Cs when the cooling water temperature Tc is equal to or greater than the set temperature Ts and the determination of the real time oxygen concentration value $C_{O2}$ are for allowing the oxygen concentration to be measured in the stabilized state of the fuel cell system as described above, thereby reducing the deviation of the measured value. Measuring the oxygen concentration for each current section may minimize a measurement variation, since the amount of oxygen moving from the cathode to the anode may be varied according to a flow rate and pressure of air supplied.

Since the oxygen concentration may vary based on the fuel cell operating system or the fuel cell system, the oxygen concentration may be measured separately in each current section. After the oxygen concentration reference value Cs for each current section is set in the controller 60, the controller 60 may be configured to acquire a real-time oxygen concentration value ($C_{O2}$) for each current section of the vehicle from the signal of the oxygen sensor, and compare the real-time oxygen concentration value ($C_{O2}$) with the oxygen concentration reference value Cs of the same current section to determine whether the current anode-side oxygen concentration meets a predetermined condition that may generate a reverse voltage (S4).

In this process, the controller may be configured to compare the oxygen concentration value ($C_{O2}$) measured in real time with a value obtained by multiplying the oxygen concentration reference value Cs of the same current section and the sensitivity coefficient S (Cs×S), as shown in FIG. 8. The sensitivity coefficient S may be set in advance in the controller 60. The sensitivity coefficient S may be used in the present invention to prevent the case where the fuel cell stack is in a dynamic state, the situation of the oxygen concentration value being temporarily high is determined to be the occurrence of reverse voltage.

Table 1 below summarizes the oxygen concentration reference value and the real time oxygen concentration value. To reduce the deviation of the oxygen concentration, the current section can be divided into three or more sections.

TABLE 1

| | Low current section (e.g. 0 A < 1 ≤ 100 A) | Medium current section (e.g. 100 A < 1 ≤ 200 A) | High current section (e.g. 200 A < 1) |
|---|---|---|---|
| $C_S$ | Average oxygen concentration value for a certain time after entering low current section at 50 deg C. or more of cooling water | Average oxygen concentration value for a certain time after entering medium current section at 50 deg C. or more of cooling water | Average oxygen concentration value for a certain time after entering high current section at 50 deg C. or more of cooling water |
| $C_{O2}$ | Real time oxygen concentration in low current section at 50 deg C. or more of cooling water after measurement of $C_S$ | Real time oxygen concentration in medium current section at 50 deg C. or more of cooling water after measurement of $C_S$ | Real time oxygen concentration in high current section at 50 deg C. or more of cooling water after measurement of $C_S$ |
| Comparison of $C_S$ and $C_{O2}$ | Comparison in the same low current | Comparison in the same medium current | Comparison in the same high current |

TABLE 1-continued

| Low current section (e.g. 0 A < 1 ≤ 100 A) | Medium current section (e.g. 100 A < 1 ≤ 200 A) | High current section (e.g. 200 A < 1) |
|---|---|---|
| section | section | section |

In step S4, the controller 60 may be configured to compare the real-time oxygen concentration value ($C_{O2}$) with the product (Cs×S) of the oxygen concentration reference value (Cs) and the sensitivity coefficient (S). When ($C_{O2}$)≥Cs×S, the current oxygen concentration may be determined to satisfy the condition that the reverse voltage is likely to occur (e.g., the controller may be configured to predict the occurrence of reverse voltage), the controller may be configured to perform the oxygen concentration reduction control for avoiding reverse voltage generation (S6). When the real-time oxygen concentration value ($C_{O2}$) is less than the product (Cs×S) of the oxygen concentration reference value (Cs) and the sensitivity coefficient (S), the controller 60 may be configured to perform the normal operation control of the conventional fuel cell system and the normal driving control of the vehicle (S5).

In the present invention, when the oxygen sensor 51 or 52 as shown in FIG. 6A is installed in both the anode outlet side passage (anode outlet manifold) and the anode inlet side passage (anode inlet manifold) in the fuel cell stack 100, the controller 60 may be configured to determine an oxygen concentration reference value (Cs) and a real time oxygen concentration value ($C_{O2}$) using a highest oxygen concentration among the oxygen concentrations detected by the two oxygen sensors (51, 52). Further, when the oxygen sensors 51 and 52 as shown in FIG. 6B are provided in the anode outlet side passage (anode outlet manifold) in the fuel cell stack 100, or in both the anode outlet side passage and the anode inlet side passage (anode inlet manifold), the controller 60 may be configured to determine the oxygen concentration reference value (Cs) and the real time oxygen concentration value ($C_{O2}$) using the maximum oxygen concentration among the oxygen concentrations detected by the respective sensing portions of the two oxygen sensors 51 and 52.

In other words, when the oxygen sensors 51 and 52 are configured to measure the oxygen concentration of each cell as in the exemplary embodiment of FIG. 6B, the real-time oxygen concentration value may be determined as the oxygen concentration of the cell having the highest oxygen concentration, i.e. the maximum oxygen concentration in the concentrations of all of the cells. This is identically applied to the cathode carbon corrosion prevention control process described with reference to FIG. 10.

In the oxygen concentration reduction control process, one or more of the anode purge operation control for discharging the anode side gas by opening the purge valve 26 provided on the anode outlet side exhaust line L2 for a set period of time every predetermined cycle, the control operation for operating the hydrogen supply device 20 to increase a supply of hydrogen to a set amount, and the control operation for operating the hydrogen supply device 20 to increase a pressure of hydrogen to a set pressure may be performed (S6). Accordingly, the oxygen concentration may be reduced and the cathode carbon corrosion condition may be avoided. When the vehicle is stopped and parked, the oxygen concentration reduction control may be performed based on the wakeup period as described above, and when the real-time oxygen concentration ($C_{O2}$) becomes less than the product of the oxygen concentration reference value (Cs) and the sensitivity coefficient, the process may return to step S3-2.

In the present invention, the real-time oxygen concentration value ($C_{O2}$) measured using the oxygen sensors 51 and 52 may be compared with the oxygen concentration reference value (Cs) corresponding to the current stack current. When the real-time oxygen concentration value ($C_{O2}$) is greater than the product of the sensitivity coefficient (S) and the oxygen concentration reference value (Cs), the controller 60 may be configured to recognize this state as the water electrolysis process during the reverse voltage process, and perform one or more of the anode purge, the increase in a supply of hydrogen, and the increase in the hydrogen pressure, thereby preventing the reverse voltage phenomenon and the cathode carbon corrosion phenomenon of the fuel cell and thus irreversible deterioration from occurring.

However, when the real-time oxygen concentration value ($C_{O2}$) is equal to or greater than the product of the oxygen concentration reference value (Cs) and the sensitivity coefficient (S) even though the reverse voltage avoidance control (oxygen concentration reduction control) is performed for a predetermined time or more when a vehicle is being driven, the controller may be configured to determine that reverse voltage avoidance is impossible, and the operation may enter the vehicle stop mode (S7, S8, S9), thereby preventing irreversible deterioration of the fuel cell stack 10 from occurring. Meanwhile, in addition to the above-described deterioration prevention control process, a control process (S10 to S17) for performance recovery at the time of cell voltage decrease may be performed in parallel. The control process for performance recovery at the time of cell voltage decrease may include a current limiting process for limiting the output current of the fuel cell stack 10 to a current value determined based on the degree of cell voltage decrease.

Figure 9:
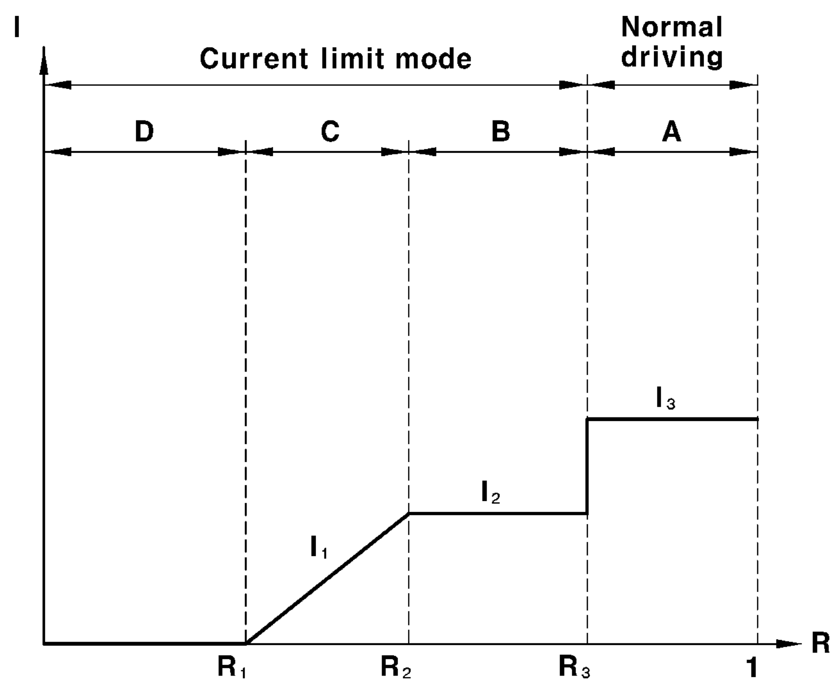
FIG. 9 is a view illustrating the control operation of the fuel cell system in which an available maximum current is determined depending on an R value according to an exemplary embodiment to the present invention.

FIG. 9 is a diagram illustrating the available maximum currents I1, I2, and I3 according to the R value indicating the degree of cell voltage drop. First, when the driver starts the vehicle by turning on the ignition key (Key On) and the vehicle is being driven (S1), the controller 60 may be configured to calculate an R value from an average cell voltage (Vavg) and minimum cell voltage (Vmin) obtained using the detected sensor signals (S10). The R value indicates the degree of decrease in the cell voltage, which is used as a basis for determining the current limitation in the fuel cell vehicle, and may be calculated by the following equation:

$$R = V\min/V\text{avg}$$

wherein, Vmin represents the minimum cell voltage, Vavg represents the average cell voltage, and the smaller the R value, the greater the deviation between the minimum cell voltage Vmin and the average cell voltage Vavg.

When the calculated R value is compared with a first set value (R3) (S11) and is determined to be equal to or greater than the first set value (R3≤R≤1), the fuel cell system may be operated in the normal current range (e.g., the current range equal to or less than the available maximum current I3 in FIG. 9) allowed by the system and the vehicle may be driven normally (S5) (section A in FIG. 9). When the R value is less than the first set value R3 (R2<R<R3, R2<R3), the current limiting mode may be activated to decrease the available maximum current from I3 to I2 (S12) (section B in FIG. 9).

At the same time, one or more of the anode purge, an increase in a supply of hydrogen, an increase in hydrogen pressure, an increase in a supply of air, and an increase in air pressure may be performed (S13). In other words, one or more of the anode purge operation control for discharging the anode-side gas by opening the purge valve 26 provided on the anode-side exhaust line L2 for a set period of time every predetermined period, the control operation for operating the hydrogen supply device 20 to increase a supply of hydrogen to a set amount, the control operation for operating the hydrogen supply device 20 to increase a pressure of hydrogen to a set pressure, the control operation for operating the oxygen supply device 30 to increase a supply of oxygen to a set amount, and the control operation for operating the oxygen supply device 30 to increase a pressure of oxygen to a set amount are performed (S13).

Thereafter, when the R value becomes equal to or greater than the first set value (R3) again (R3≤R≤1), the fuel cell system may be operated in the normal current range (e.g., the current range equal to or less than the available maximum current I3 in FIG. 9) allowed by the system and the vehicle may be driven normally (S14, S15, S5) (section A in FIG. 9). When the cell drift further increases relative to the section 'B', that is, when the R value becomes less than a second set value (R2) (R1≤R≤R2, R1<R2), the available maximum current for recovery of the cell voltage may be further decreased from I2 to I1 (S14, S15, S16) (section 'C' in FIG. 9). In particular, the available maximum current (I1) is set to decrease at a constant slope as the R value decreases.

Further, when the R value becomes less than the third set value (R1) (R≤R1), the cell voltage deviation is extreme, leading to the vehicle being stopped (section 'D' in FIG. 9). After entering the current limiting mode, current limitation may be performed to prevent the current output from the fuel cell stack 10 from exceeding the available maximum current, while changing the available maximum current according to the R value indicating the degree of cell voltage deviation. In addition, when the driver turns off the ignition key in step S17 while the vehicle is running normally or in the current limited mode, the vehicle operation may be stopped after the fuel cell system is shut down.

Figure 10:
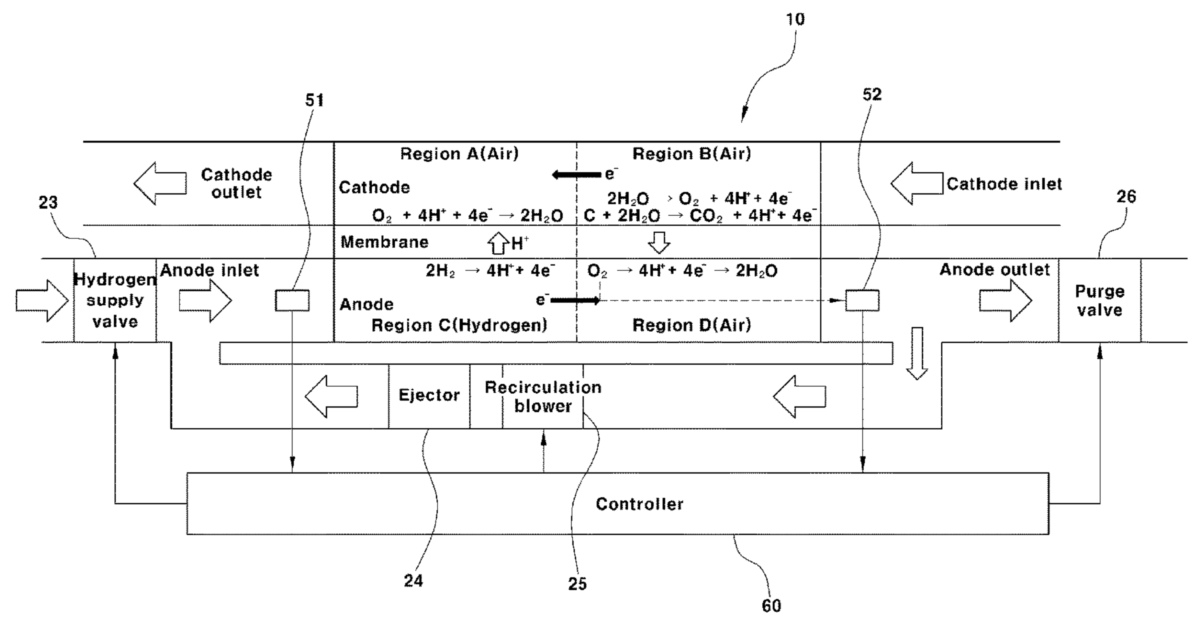
FIG. 10 is a block diagram illustrating a control system performing a control operation for prevention of cathode carbon corrosion occurring upon the inflow of air into the fuel cell stack according to an exemplary embodiment to the present invention.

Moreover, a description will be provided herein below of a control process for preventing the cathode corrosion occurring when external air is introduced into the fuel cell stack 10, particularly into the anode of the fuel cell stack 10 through the clearance of the shutoff valve 33, 34 in the state where the vehicle is stopped and parked as described above. FIG. 10 is a configuration diagram of a system for performing a control process for preventing the cathode corrosion when air is introduced into the fuel cell stack 10 according to the present invention. Even though the fuel cell vehicle is parked, the controller 60 may be configured to periodically wake up. At this time, the controller 60 and the oxygen sensors 51 and 52 may be supplied with operating power so that the oxygen sensors 51 and 52 measure the oxygen concentration (C) in the gases on the anode side of the stack 10 and transmit the electrical signals corresponding to the measured oxygen concentration (C) to the controller 60.

The controller 60 may then be configured to receive the electrical signal that corresponds to the oxygen concentration. When the oxygen concentration (C) measured by the oxygen sensors 51 and 52 is equal to or greater than a predetermined oxygen concentration reference value (L) (i.e., a second oxygen concentration reference value), the controller may be configured to determine that external air has been introduced into the anode of the stack 10. In particular, the oxygen concentration reference value (L) (e.g., second oxygen concentration reference value) may be a different value from the oxygen concentration reference value (e.g., first oxygen concentration reference value) of FIG. 8 determined based on the stack current during driving of a vehicle.

When determining the introduction of external air, the controller 60 may be configured to operate the hydrogen supply device 20 to supply hydrogen to the anode inlet side of the fuel cell stack 10. In other words, the controller 60 may be configured to open the hydrogen supply valve 23 to allow hydrogen, which is the fuel gas stored in the hydrogen tank 21, to be supplied to the anode of the fuel cell stack 10, or additionally activate the recirculation blower 25 to supply hydrogen to the anode inlet side of the fuel cell stack 10. The controller 60 may be configured to output a control signal for performing the purge operation, whereby the purge valve 26 may be opened from the control signal output by the controller 60 to discharge oxygen into the anode to decrease the oxygen concentration to less than the reference value.

Figure 11:
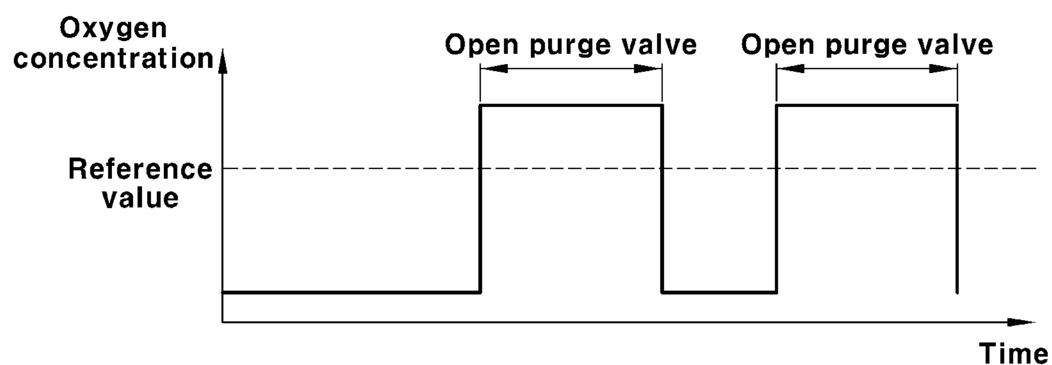
FIG. 11 is a view illustrating the anode purge control in the control operation of the fuel cell system according to an exemplary embodiment of the present invention.

In an exemplary embodiment, the controller 60 may be configured to maintain the open state of the purge valve 26 until the oxygen concentration measured by the oxygen sensors 51, 52 is less than the oxygen concentration reference value, as shown in FIG. 11. Even when the oxygen concentration is less than the oxygen concentration reference value so that the purge valve 26 is closed, when the oxygen concentration becomes again equal to or greater than the oxygen concentration reference value when the controller 60 and the oxygen sensors 51 and 52 are in the wakeup state in the wakeup period, the controller 60 may be configured to open the purge valve 26 again to discharge oxygen from the anode of the stack.

When opening the purge valve 26 is the state in which the oxygen concentration is greater than the oxygen concentration reference value, the controller 60 may be configured to close the purge valve 26 after opening the purge valve 26 for a predetermined time of period, i.e. for repeatedly opening and closing the purge valve 26 in a short cycle. Accordingly, cathode corrosion may be prevented even when external air is introduced into the stack during parking of the vehicle. The oxygen concentration reference value (e.g., second oxygen concentration reference value) in the control process for preventing corrosion of the cathode as described above may be the same as or different from the oxygen concentration reference value (e.g., first oxygen concentration reference value) used in the control process for preventing irreversible deterioration shown in FIG. 8.

As described before, in the present invention, the oxygen sensor may be mounted on the anode inlet side and the anode outlet side of the fuel cell stack to measure the oxygen concentration, and based on the measured oxygen concentration, a control operation may be performed on the fuel cell system to reduce the oxygen concentration on the anode side, thereby effectively reducing irreversible deterioration of the fuel cell that may occur due to the reverse voltage of the cell during driving of the fuel cell vehicle and the cathode carbon corrosion due to the inflow of air during parking.

As a result, it may be possible to secure the performance and stability of the fuel cell vehicle, and the durability and safety of the fuel cell through advance response to the reverse voltage deterioration. Particularly, although the related art technique may respond to reversible cell deterioration due to flooding, which is a water flooding phenomenon, with the technique was unable to substantially respond to irreversible deterioration due to reverse voltage. However, in the present invention, the concentration of oxygen generated in the electrolysis step of water prior to the carbon corrosion stage at the time of reverse voltage may be measured, and when the oxygen concentration is greater than a certain level, control for proactive response may be performed before occurrence of carbon corrosion, which is irreversible deterioration, to thus prevent the carbon corrosion from occurring, thereby securing the performance and stability of the fuel cell vehicle, and the durability and safety of the fuel cell.

Furthermore, as compared with the periodic purge operation to prevent carbon corrosion without the oxygen sensor during parking in a fuel cell vehicle, in the present invention, since the oxygen sensor does not have high power consumption, the hydrogen supply and the anode purge operation may be performed only when the oxygen concentration on the anode side of the stack is equal to or greater than the reference value, thereby being advantageous in terms of efficiency and power consumption.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel cell system, comprising:

a fuel cell stack;

a hydrogen supply device configured to supply hydrogen to the fuel cell stack;

an air supply device configured to supply air to the fuel cell stack;

a controller configured to operate a fuel cell operation device; and an oxygen sensor installed in the fuel cell stack to detect an oxygen concentration in gases on an anode side, wherein during operation of the fuel cell system, the controller is configured to:

determine whether a current oxygen concentration on the anode side satisfies a predetermined condition that will generate a reverse voltage, based on a real time oxygen concentration value detected by the oxygen sensor and a first oxygen concentration reference value that corresponds to a current fuel cell operating current, and operate the fuel cell operation device to reduce the oxygen concentration on the anode side when the current oxygen concentration on the anode side is determined to satisfy the predetermined condition to prevent deterioration on the anode side due to generation of the reverse voltage in the cell of the stack, and wherein the oxygen sensor is inserted longitudinally and installed along an anode outlet manifold which is an anode outlet side passage in the fuel cell stack.

2. A fuel cell system, comprising:

a fuel cell stack;

a hydrogen supply device configured to supply hydrogen to the fuel cell stack;

an air supply device configured to supply air to the fuel cell stack;

a controller configured to operate a fuel cell operation device; and an oxygen sensor installed in the fuel cell stack to detect an oxygen concentration in gases on an anode side, wherein during operation of the fuel cell system, the controller is configured to:

determine whether a current oxygen concentration on the anode side satisfies a predetermined condition that will generate a reverse voltage, based on a real time oxygen concentration value detected by the oxygen sensor and a first oxygen concentration reference value that corresponds to a current fuel cell operating current, and operate the fuel cell operation device to reduce the oxygen concentration on the anode side when the current oxygen concentration on the anode side is determined to satisfy the predetermined condition to prevent deterioration on the anode side due to generation of the reverse voltage in the cell of the stack, and wherein the oxygen sensor includes:

a first oxygen sensor inserted longitudinally and installed along an anode outlet manifold, which is an anode outlet side passage in the fuel cell stack; and a second oxygen sensor inserted longitudinally and installed along an anode inlet manifold, which is an anode inlet side passage in the fuel cell stack, wherein during operation of the fuel cell system, the controller uses a maximum oxygen concentration of the oxygen concentration detected by the first oxygen sensor and the oxygen concentration detected by the second oxygen sensor as the real time oxygen concentration value.

3. The fuel cell system of claim 2, wherein both ends of the first oxygen sensor and the second oxygen sensor are fixed to end plates on both ends of the fuel cell stack.

4. The fuel cell system of claim 3, wherein coupling pins protrude from both ends of the first oxygen sensor and the second oxygen sensor, and the coupling pins at both ends of the first oxygen sensor and the second oxygen sensor are inserted and fixed in pin grooves of the end plates.

5. The fuel cell system of claim 3, wherein wires of the first oxygen sensor and the second oxygen sensor are respectively connected to the controller through apertures formed in one of the two end plates at both ends of the fuel cell stack, wherein a sealing member is provided in the aperture to seal the wire.

6. The fuel cell system of claim 2, wherein the first oxygen sensor and the second oxygen sensor each include a plurality of sensing portions arranged in the form of individual sensor elements along the longitudinal direction of a sensor body, wherein the sensing portions are connected in parallel to the controller, and wherein the controller uses the maximum oxygen concentration of the oxygen concentrations detected by sensing portions of the two oxygen sensors as the real time oxygen concentration value.

7. The fuel cell system of claim 6, wherein in each of the oxygen sensors, the sensing portions are arranged in a zigzag shape along the longitudinal direction of the sensor body to secure gaps and measurement intervals between the sensing portions.

8. The fuel cell system of claim 1, wherein the decreasing of the oxygen concentration on the anode side includes one or more of an anode purge operation control for discharging an anode side gas by opening a purge valve installed in an anode outlet side exhaust line of the fuel cell stack, a control operation for operating the hydrogen supply device to increase a supply of hydrogen to a set amount, and a control operation for operating the hydrogen supply device to increase a pressure of hydrogen to a set pressure.

9. The fuel cell system of claim 1, wherein the controller is configured to compare the real time oxygen concentration value with a product of the first oxygen concentration reference value and a predetermined sensitivity coefficient, and when the real time oxygen concentration value is equal to or greater than the product of the first oxygen concentration reference value and the sensitivity coefficient, determine that the predetermined condition that will generate a reverse voltage is satisfied, wherein the sensitivity coefficient is set in advance in the controller and is used to prevent a case where the fuel cell stack is in a dynamic state, and a situation of the real time oxygen concentration value being temporarily high is determined to be the reverse voltage.

10. The fuel cell system of claim 1, wherein the controller is configured to, when a set time has elapsed after the start of operation of the fuel cell system, or when the operating temperature of the fuel cell stack has reached a predetermined set temperature, determine whether the current oxygen concentration on the anode side satisfies the predetermined condition that will generate a reverse voltage by using the real time oxygen concentration value detected by the oxygen sensor to prevent a concentration measurement error due to oxygen remaining in the anode of the fuel cell stack at the initial stage of operation of the fuel cell system.

11. The fuel cell system of claim 1, wherein during parking of a vehicle, the controller is configured to, when the oxygen concentration detected by the oxygen sensor is equal to or greater than a predetermined second oxygen concentration reference value, determine that air has been introduced into the anode of the fuel cell stack, and the controller is configured to operate the hydrogen supply device to supply hydrogen to the anode of the fuel cell stack and to open a purge valve installed on an anode outlet side exhaust line of the fuel cell stack to discharge an anode-side gas, to prevent deterioration on a cathode side due to the introduction of air.

12. The fuel cell system of claim 11, wherein the oxygen sensor includes:

a first oxygen sensor inserted longitudinally and installed along an anode outlet manifold, which is an anode outlet side passage in the fuel cell stack; and a second oxygen sensor inserted longitudinally and installed along an anode inlet manifold, which is an anode inlet side passage in the fuel cell stack, wherein during parking of a vehicle, the controller is configured to compare the maximum oxygen concentration of the oxygen concentration detected by the first oxygen sensor and the oxygen concentration detected by the second oxygen sensor with the second oxygen concentration reference value, and when the maximum oxygen concentration is determined to be equal to or greater than the second oxygen concentration reference value, determine that air has been introduced into the anode of the fuel cell stack.

13. The fuel cell system of claim 1, wherein the first oxygen concentration reference value is determined for each of a plurality of current sections which has a predetermined current range based on an operating current of the fuel cell stack, and the first oxygen concentration reference value of one of the plurality of current sections corresponding to the current fuel cell operating current is used to determine whether the current oxygen concentration on the anode side satisfies the predetermined condition that will generate the reverse voltage.

14. The fuel cell system of claim 13, wherein the controller is configured to, when a set time has elapsed after the start of operation of the fuel cell system, or when the operating temperature of the fuel cell stack has reached a predetermined set temperature, determine an average value of the oxygen concentrations detected by the oxygen sensor for a predetermined time from a time when the current fuel cell stack operating current enters the one current section, and use the determined average value as the first oxygen concentration reference value of the one current section.

* * * * *